US012632741B2

(12) United States Patent (10) Patent No.: US 12,632,741 B2
Mao et al. (45) Date of Patent: May 19, 2026

(54) AGENT TRAINING METHOD, APPARATUS, AND COMPUTER-READABLE STORAGE MEDIUM

(71) Applicant: HUAWEI TECHNOLOGIES CO., LTD., Shenzhen (CN)

(72) Inventors: Hangyu Mao, Shenzhen (CN); Wulong Liu, Montreal (CA); Jianye Hao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 894 days.

(21) Appl. No.: 17/877,063

(22) Filed: Jul. 29, 2022

(65) Prior Publication Data

US 2022/0366266 A1 Nov. 17, 2022

Related U.S. Application Data

(63) Continuation of application No. PCT/CN2020/119396, filed on Sep. 30, 2020.

(30) Foreign Application Priority Data

Jan. 31, 2020 (CN) .......................... 202010077714.8

(51) Int. Cl.
*G06N 3/04* (2023.01)
*G06N 3/045* (2023.01)
(Continued)

(52) U.S. Cl.
CPC ............. *G06N 3/088* (2013.01); *G06N 3/045* (2023.01); *G06N 3/092* (2023.01); *H04L 45/08* (2013.01)

(58) Field of Classification Search
CPC ............................... G06N 3/045; G06N 3/092
See application file for complete search history.

(56) References Cited

U.S. PATENT DOCUMENTS

2018/0330178 A1 11/2018 El Kaliouby et al.
2019/0072965 A1 3/2019 Zhang et al.
(Continued)

FOREIGN PATENT DOCUMENTS

CN 105467839 A 4/2016
CN 108881048 A 11/2018
(Continued)

OTHER PUBLICATIONS

Kuedong Liang, I. Balasingham and Sang-Seon Byun, "A multi-agent reinforcement learning based routing protocol for wireless sensor networks," 2008 IEEE International Symposium on Wireless Communication Systems, 2008, pp. 552-557, doi: 10.1109/ISWCS. 2008.4726117.
(Continued)

*Primary Examiner* — Hal Schnee
(74) *Attorney, Agent, or Firm* — Rimon PC

(57) ABSTRACT

An agent training method includes: obtaining environment information of a first agent and environment information of a second agent; generating first information based on the environment information of the first agent and the environment information of the second agent; and training the first agent by using the first information, so that the first agent outputs individual cognition information and neighborhood cognition information. The neighborhood cognition information of the first agent is consistent with neighborhood cognition information of the second agent.

20 Claims, 6 Drawing Sheets

(51) Int. Cl.

| | |
|---|---|
| *G06N 3/088* | (2023.01) |
| *G06N 3/09* | (2023.01) |
| *G06N 3/092* | (2023.01) |
| *H04L 45/02* | (2022.01) |

(56) References Cited

U.S. PATENT DOCUMENTS

| | | | |
|---|---|---|---|
| 2019/0354100 A1 | 11/2019 | Lopez Mejia et al. | |
| 2019/0370394 A1 | 12/2019 | Li et al. | |
| 2020/0160168 A1* | 5/2020 | Yang ...................... | G06N 3/047 |

FOREIGN PATENT DOCUMENTS

| | | |
|---|---|---|
| CN | 109682392 A | 4/2019 |
| CN | 109952582 A | 6/2019 |
| CN | 109978176 A | 7/2019 |
| CN | 110311863 A | 10/2019 |
| WO | 2019232355 A1 | 12/2019 |

OTHER PUBLICATIONS

Wang Xing Ce et al, Research on Dynamic Team Formation of Multi-Robots Reinforcement Learning, Journal of Computer Research and Development , 2003, 5 pages (machine translation).

Cheng Chao et al, Traffic Distribution Algorithm Based on Multi-Agent Reinforcement Learning, Journal of Beijing University of Posts and Telecommunications, 2019, with the English Translation, 13 pages.

Jakob N. Foerster et al, Learning to Communicate with Deep Multi-Agent Reinforcement Learning, arXiv:1605.06676v2 [cs.AI] May 24, 2016, 13 pages.

S. Kar, J. M. F. Moura and H. V. Poor, "Distributed reinforcement learning in multi-agent networks," 2013 5th IEEE International Workshop on Computational Advances in Multi-Sensor Adaptive Processing (CAMSAP), 2013, pp. 296-299, doi: 10.1109/CAMSAP. 2013.6714066.

Jiang chuanqi, The Research on Conditional Variational Auto-encoder and Its Optimization Method for Network Performance Prediction, 2019, 19 pages (6 pages +13 pages).

Sainbayar Sukhbaatar et al, Learning Multiagent Communication with Backpropagation, arXiv:1605.07736v2 [cs.LG] Oct. 31, 2016, 12 pages.

Wang Xing Ce et al, Research on Dynamic Team Formation of Multi-Robots Reinforcement Learning, Journal of Computer Research and Development , 2003, 7 pages.

Zhu Qingsheng et al, Application Research of Preprocess in BP Neural Network Sample Data, 2012, 3 pages.

Peng Peng et al, Multiagent Bidirectionally-Coordinated Nets Emergence of Human-level Coordination in Learning to Play StarCraft Combat Games, arXiv:1703.10069v4 [cs.AI] Sep. 14, 2017, 10 pages.

Hu Ming-hui et al, Coordination strategies learning of soccer robot based on self-organizing and LVQ NN, Journal of Nanchang Institute of Aeronautical Technology, 2004, 5 pages.

Yuan feiniu et al, Theories and applications of auto-encoder neural newworks: a literature survey, 2019,28 pages.

Jakob N. Foerster et al, Counterfactual Multi-Agent Policy Gradients, arXiv:1705.08926v2 [cs.AI] Dec. 14, 2017, 10 pages.

Peng jun, Cooperation Models for the Multi-agent System and Application to the RoboCup Soccer Simulator, 2006, 2 pages (abstract).

Ryan Lowe et al, Multi-Agent Actor-Critic for Mixed Cooperative-Competitive Environments, arXiv:1706.02275v2 [cs.LG] Jun. 21, 2017, 16 pages.

Peter Sunehag et al, Value-Decomposition Networks For Cooperative Multi-Agent Learning, 2017, 17 pages.

Tabish Rashid et al, QMIX: Monotonic Value Function Factorisation for Deep Multi-Agent Reinforcement Learning, arXiv:1803. 11485v2 [cs.LG] Jun. 6, 2018, 14 pages.

Tabish Rashid et al, QMIX Monotonic Value Function Factorisation for Deep Multi-Agent Reinforcement Learning, 2018 , 14 pages.

Jiechuan Jiang et al, Learning Attentional Communication for Multi-Agent Cooperation, arXiv:1805.07733v3 [cs.AI] Nov. 22, 2018, 12 pages.

Jiechuan Jiang et al, Graph Convolutional Reinforcement Learning, arXiv:1810.09202v3 [cs.LG] Sep. 26, 2019, 12 pages.

Christian A. Schroeder de Witt et al, Multi-Agent Common Knowledge Reinforcement Learning, arXiv:1810.11702v8 [cs.MA] Jan. 11, 2020, 17 pages.

Hangyu Mao et al, Modelling the Dynamic Joint Policy of Teammates with Attention Multi-agent DDPG, arXiv:1811.07029v1 [cs. LG] Nov. 13, 2018, 17 pages.

Kyunghwan Son et al, QTRAN: Learning to Factorize with Transformation for Cooperative Multi-Agent Reinforcement learning, arXiv:1905.05408v1 [cs.LG] May 14, 2019, 18 pages.

Afshin Oroojlooy Jadid et al, A Review of Cooperative Multi-Agent Deep Reinforcement Learning, arXiv:1908.03963v2 [cs.LG] Sep. 18, 2019, 34 pages.

Chen Lei et al, Literature Review on the Consistency of Multi-agent Systems, Automation Panorama, Feb. 2018, with the English Abstract, 5 pages.

Peter Sunehag et al, Value-Decomposition Networks For Cooperative Multi-Agent Learning Based On Team Reward, Main Track Extended Abstract, AAMAS 2018, Jul. 10-15, 2018, Stockholm, Sweden, 3 pages.

Yang kai, Research on multi-agent consensus protocol based on neighborhood information selection, A Dissertation Submitted to Guangdong University of Technology for the Degree of Master, May 2018, with the English Abstract, 81 pages.

* cited by examiner

200

600

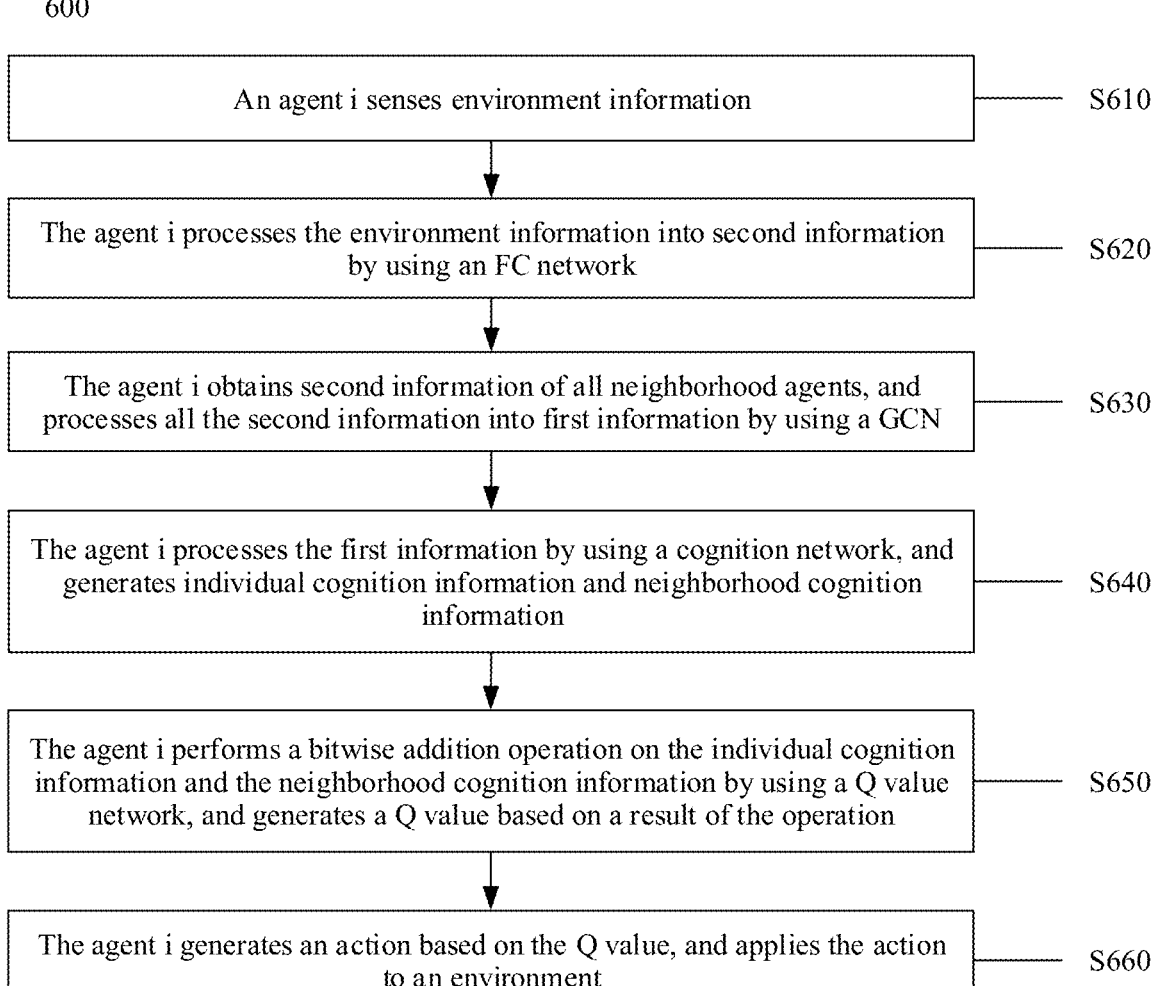

| An agent i senses environment information | — S610 |

| The agent i processes the environment information into second information by using an FC network | — S620 |

| The agent i obtains second information of all neighborhood agents, and processes all the second information into first information by using a GCN | — S630 |

| The agent i processes the first information by using a cognition network, and generates individual cognition information and neighborhood cognition information | — S640 |

| The agent i performs a bitwise addition operation on the individual cognition information and the neighborhood cognition information by using a Q value network, and generates a Q value based on a result of the operation | — S650 |

| The agent i generates an action based on the Q value, and applies the action to an environment | — S660 |

FIG. 6

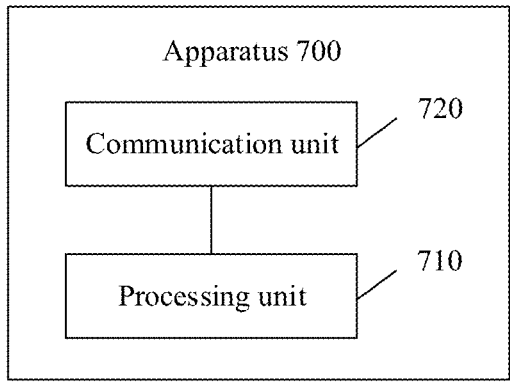

FIG. 7

AGENT TRAINING METHOD, APPARATUS, AND COMPUTER-READABLE STORAGE MEDIUM

CROSS-REFERENCE TO RELATED APPLICATIONS

This application is a continuation of International Application No. PCT/CN2020/119396, filed on Sep. 30, 2020, which claims priority to Chinese Patent Application No. 202010077714.8, filed on Jan. 31, 2020. The disclosures of the aforementioned applications are hereby incorporated by reference in their entireties.

TECHNICAL FIELD

This application relates to the field of artificial intelligence, and more specifically, to an agent training method and apparatus.

BACKGROUND

Multi-agent collaboration is an application scenario in the field of artificial intelligence. For example, in a communication network including a plurality of routers, each router may be considered as an agent, each router has its own traffic scheduling policy, and traffic scheduling policies of the plurality of routers need to be coordinated with each other, to complete a traffic scheduling task by using fewer resources.

A method for resolving the foregoing problem is multi-agent reinforcement learning. In this method, an objective of a specific task is described as a reward function. An agent directly interacts with an environment and another agent, and obtains a policy of a maximum long-term accumulated reward through auto-learning, so as to coordinate the plurality of agents to process the specific task.

Currently, a global coordination mechanism is usually used in a multi-agent reinforcement learning method. When there are a small quantity of agents, an effect of the global coordination mechanism is acceptable. When there are a large quantity of agents, an interaction relationship between agents is very complex, and the effect of the global coordination mechanism cannot meet requirements. How to coordinate policies of the plurality of agents is a problem that needs to be resolved currently.

SUMMARY

This application provides an agent training method, an apparatus, and a computer-readable storage medium to achieve a good multi-agent collaboration effect.

According to a first aspect, an agent training method is provided. The method includes: obtaining environment information of a first agent and environment information of a second agent; generating first information based on the environment information of the first agent and the environment information of the second agent; and training the first agent by using the first information, so that the first agent outputs individual cognition information and neighborhood cognition information. The neighborhood cognition information of the first agent is consistent with neighborhood cognition information of the second agent.

Because the neighborhood cognition information of the first agent is the same as or similar to the neighborhood cognition information of the second agent, the first agent obtained by training based on the neighborhood cognition information of the first agent improves a degree of correct cognition of the first agent on a neighborhood environment, and a finally obtained action generated by the first agent can improve collaboration between a plurality of agents. In addition, the individual cognition information reflects a specific environment of the first agent, and the first agent is trained based on the individual cognition information and the neighborhood cognition information, so that the action generated by the first agent can meet an individual requirement of the first agent and a requirement of a neighborhood agent.

Optionally, the generating first information based on the environment information of the first agent and the environment information of the second agent includes:

generating second information $h_i$ of the first agent based on the environment information of the first agent;

generating second information $h_j$ of the second agent based on the environment information of the second agent; and generating the first information based on $h_i$ and $h_j$.

The environment information $o_i$ of the first agent and the environment information $o_j$ of the second agent may be converted into second information by using a deep neural network. The second information includes abstracted content of $o_i$ and $o_j$, and includes richer content than original environment information ($o_i$ and $o_j$). This helps a neural network that makes a decision make a more accurate decision.

Optionally, the generating the first information based on $h_i$ and $h_j$ includes: determining a first result based on a product of $h_i$ and a first matrix; determining a second result based on a product of $h_j$ and a second matrix; and generating the first information based on the first result and the second result.

A multiplication operation may be performed on $h_i$ and the first matrix to obtain the first result, a multiplication operation may be performed on $h_j$ and the second matrix to obtain the second result, and then $H_i$ is generated based on the first result and the second result. For example, a weighted sum operation is performed on the first result and the second result or they are combined, to obtain $H_i$. Because $h_i$ and $h_j$ are two small-sized matrices, this method can reduce an amount of computation required for generating $H_i$. In addition, the first matrix and the second matrix may be a same matrix, or may be different matrices. When the first matrix is the same as the second matrix, $h_i$ and $h_j$ share a same set of parameters, which helps a Graphs Convolution Network (GCN) learn more content.

Optionally, the method further includes: obtaining the neighborhood cognition information $\hat{c}_j$ of the second agent; and training a neural network generating the neighborhood cognition information $\hat{C}_i$ of the first agent based on the neighborhood cognition information $\hat{c}_j$ of the second agent, so that $\hat{c}_i$ is consistent with $\hat{C}_i$.

$\hat{c}_j$ being consistent with $\hat{C}_i$ means that $\hat{c}_j$ is the same as or similar to $\hat{C}_i$. An objective of training the neural network generating $\hat{C}_i$ based on a loss function including $\hat{c}_j$ and $\hat{C}_i$ is to enable a plurality of agents located in one neighborhood to have same or approximately same cognition of a neighborhood environment. If predicted values of neighborhood cognition information of agents are the same or similar to a true value, cognition of the neighborhood environment by a plurality of agents located in one neighborhood is definitely the same or similar. This solution can improve the degree of correct cognition of the first agent on the neighborhood environment.

Optionally, the training a neural network generating the neighborhood cognition information $\hat{C}_i$ of the first agent based on the neighborhood cognition information $\hat{c}_j$ of the second agent includes: training the neural network generating $\hat{C}_i$ based on the loss function including $\hat{c}_j$ and $\hat{C}_i$.

Optionally, the loss function including $\hat{c}_j$ and $\hat{C}_i$ is KL(q $(\hat{C}_i|o_i; w_i)\|q(\hat{C}_j|o_j;w_j))$. KL represents KL divergence, q represents a probability distribution, $o_i$ represents the environment information of the first agent, $w_i$ represents a weight of the neural network generating $\hat{C}_i$ based on $o_i$, $o_j$ represents the environment information of the second agent, and $w_j$ represents a weight of the neural network generating $\hat{C}_j$ based on $o_j$.

Optionally, the training the first agent by using the first information, so that the first agent outputs individual cognition information and neighborhood cognition information includes: determining the neighborhood cognition information $\hat{C}_i$ of the first agent based on the first information and a variational autoencoder.

Optionally, the determining the neighborhood cognition information $\hat{C}_i$ of the first agent based on the first information and a variational autoencoder includes: determining a distribution average value $$\hat{C}_i^\mu$$

and a distribution variance $$\hat{C}_i^\sigma$$

of the neighborhood cognition information of the first agent based on the first information; obtaining a random value E by sampling from a unit Gaussian distribution; and determining $\hat{C}_i$ based on $$\hat{C}_i^\mu, \hat{C}_i^\sigma, \text{ and } \varepsilon, \text{ where } \hat{C}_i = \hat{C}_i^\mu + \hat{C}_i^\sigma \odot \varepsilon.$$

Because $\hat{C}_i$ is generated based on the random value ε, in this $\hat{C}_i$ generation method, a value of $\hat{C}_i$ can be diversified, and the neural network obtained by training based on $\hat{C}_i$ has better robustness.

Optionally, the method further includes: determining an estimate $\hat{o}_i$ of the environment information of the first agent based on the neighborhood cognition information $\hat{C}_i$ of the first agent; and training the neural network generating $\hat{C}_i$ based on a loss function including $o_i$ and $\hat{o}_i$.

Training the neural network generating $\hat{C}_i$ based on the loss function including $o_i$ and $\hat{o}_i$ can make $o_i$ and $\hat{o}_i$ the same or similar. When $o_i$ and $\hat{o}_i$ are the same or similar, it indicates that the environment information $o_i$ can be restored from a predicted value $\hat{C}_i$ of the neighborhood cognition information, that is, $\hat{C}_i$ is correct cognition of the neighborhood environment.

Optionally, the loss function including $o_i$ and $\hat{o}_i$ is L2($o_i$, $\hat{o}_i$;$w_i$), L2 represents L2 regularization, and $w_i$ represents the weight of the neural network generating $\hat{C}_i$ based on $o_i$.

Optionally, the method further includes: determining a Q value of the first agent based on the individual cognition information and the neighborhood cognition information of the first agent; and training the first agent based on the Q value of the first agent.

The Q value reflects quality of the action generated by the first agent, and training the first agent based on the Q value can improve the quality of the action generated by the first agent.

Optionally, the training the first agent based on the Q value of the first agent includes: determining Q values $Q_{total}$ of the plurality of agents based on the Q value of the first agent and a Q value of the second agent; and training the first agent based on $Q_{total}$.

$Q_{total}$ can better reflect a proportion of a task undertaken by a single agent to tasks undertaken by the plurality of agents, and an action generated based on $Q_{total}$ can enhance global coordination.

According to a second aspect, an agent-based instruction generation method is provided. The method includes: obtaining target environment information of a first agent and target environment information of a second agent; generating target first information based on the target environment information of the first agent and the target environment information of the second agent; outputting target individual cognition information and target neighborhood cognition information of the first agent based on the target first information, where the target neighborhood cognition information of the first agent is consistent with target neighborhood cognition information of the second agent; and generating an instruction based on the target individual cognition information and the target neighborhood cognition information of the first agent.

Because the target neighborhood cognition information of the first agent is the same as or similar to the target neighborhood cognition information of the second agent, an action generated based on the target neighborhood cognition information of the first agent can improve collaboration between a plurality of agents. In addition, the target individual cognition information reflects a specific environment of the first agent, and the action generated based on the target individual cognition information and the target neighborhood cognition information can meet an individual requirement of the first agent and a requirement of a neighborhood agent.

Optionally, the generating target first information based on the target environment information of the first agent and the target environment information of the second agent includes: generating target second information of the first agent based on the target environment information of the first agent; generating target second information of the second agent based on the target environment information of the second agent; and generating the target first information based on the target second information of the first agent and the target second information of the second agent.

The target environment information of the first agent and the target environment information of the second agent may be converted into target second information by using a deep neural network. The target second information includes abstracted content of target environment information, and includes richer content than original environment information (the target environment information). This helps a neural network that makes a decision make a more accurate decision.

Optionally, the generating an instruction based on the target individual cognition information and the target neighborhood cognition information of the first agent includes: generating a target Q value based on the target individual cognition information of the first agent and target neighborhood information of a target agent; and generating the instruction based on the target Q value.

The Q value reflects quality of an action generated by the first agent, and generating the instruction based on the Q value can improve an instruction of high quality.

Optionally, the first agent is obtained through training by using the following method: obtaining training environment information of the first agent and training environment information of the second agent; generating first training information based on the training environment information of the first agent and the training environment information of the second agent; and training the first agent by using the first training information, so that the first agent outputs training individual cognition information and training neighborhood cognition information, where the training neighborhood cognition information of the first agent is consistent with training neighborhood cognition information of the second agent.

Because the training neighborhood cognition information of the first agent is the same as or similar to the training neighborhood cognition information of the second agent, the first agent obtained by training based on the training neighborhood cognition information of the first agent improves a degree of correct cognition of the first agent on a neighborhood environment, and the finally obtained action generated by the first agent can improve the collaboration effect between the plurality of agents. In addition, the training individual cognition information reflects the specific environment of the first agent, and the first agent is trained based on the training individual cognition information and the training neighborhood cognition information, so that the action generated by the first agent can meet the individual requirement of the first agent and the requirement of the neighborhood agent.

Optionally, the generating first training information based on the training environment information of the first agent and the training environment information of the second agent includes: generating second training information $h_i$ of the first agent based on the training environment information of the first agent; generating second training information $h_j$ of the second agent based on the training environment information of the second agent; and generating the first training information based on $h_i$ and $h_j$.

The training environment information $o_i$ of the first agent and the training environment information $o_j$ of the second agent may be converted into second training information by using the deep neural network. The second training information includes abstracted content of $o_i$ and $o_j$, and includes richer content than training environment information ($o_i$ and $o_j$). This helps the neural network that makes a decision make the more accurate decision.

Optionally, the generating the first training information based on $h_i$ and $h_j$ includes: determining a first result based on a product of $h_i$ and a first matrix; determining a second result based on a product of $h_j$ and a second matrix; and generating the first training information based on the first result and the second result.

A multiplication operation may be performed on $h_i$ and the first matrix to obtain the first result, a multiplication operation may be performed on $h_j$ and the second matrix to obtain the second result, and then $H_i$ is generated based on the first result and the second result. For example, a weighted sum operation is performed on the first result and the second result or they are combined, to obtain $H_i$. Because $h_i$ and $h_j$ are two small-sized matrices, this method can reduce an amount of computation required for generating $H_i$. In addition, the first matrix and the second matrix may be a same matrix, or may be different matrices. When the first matrix is the same as the second matrix, $h_i$ and $h_j$ share a same set of parameters, which helps a GCN learn more content.

Optionally, the method further includes: obtaining the training neighborhood cognition information $\hat{C}_j$ of the second agent; and training a neural network generating the training neighborhood cognition information $\hat{C}_i$ of the first agent based on the training neighborhood cognition information $\hat{C}_j$ of the second agent, so that $\hat{C}_j$ is consistent with $\hat{C}_i$.

That $\hat{C}_j$ is consistent with $\hat{C}_i$ means that $\hat{C}_j$ is the same as or similar to $\hat{C}_i$. An objective of training the neural network generating $\hat{C}_i$ based on a loss function including $\hat{C}_j$ and $\hat{C}_i$ is to enable a plurality of agents located in one neighborhood to have same or approximately same cognition of a neighborhood environment. If predicted values of neighborhood cognition information of agents are the same or similar to a true value, cognition of the neighborhood environment by a plurality of agents located in one neighborhood is definitely the same or similar. This solution can improve the degree of correct cognition of the first agent on the neighborhood environment.

Optionally, the training a neural network generating the training neighborhood cognition information $\hat{C}_i$ of the first agent based on the training neighborhood cognition information $\hat{C}_j$ of the second agent includes: training the neural network generating $\hat{C}_i$ based on the loss function including $\hat{C}_j$ and $\hat{C}_i$.

Optionally, the loss function including $\hat{C}_j$ and $\hat{C}_i$ is $KL(q(\hat{C}_i|o_i; w_i)\|q(\hat{C}_j|o_j; w_j))$. KL represents KL divergence, q represents a probability distribution, $o_i$ represents the training environment information of the first agent, $w_i$ represents a weight of the neural network generating $\hat{C}_i$ based on $o_i$, $o_j$ represents the training environment information of the second agent, and W represents a weight of the neural network generating $\hat{C}_j$ based on $o_j$.

Optionally, the training the first agent by using the first training information, so that the first agent outputs training individual cognition information and training neighborhood cognition information includes: determining the training neighborhood cognition information $\hat{C}_i$ of the first agent based on the first training information and a variational autoencoder.

Optionally, the determining the training neighborhood cognition information $\hat{C}_i$ of the first agent based on the first training information and a variational autoencoder includes: determining a distribution average value $$\hat{C}_i^{\mu}$$

and a distribution variance $$\hat{C}_i^{\sigma}$$

of the training neighborhood cognition information of the first agent based on the first training information; obtaining a random value $\varepsilon$ by sampling from a unit Gaussian distribution; and determining $\hat{C}_i$ based on $$\hat{C}_i^{\mu}, \hat{C}_i^{\sigma}, \text{ and } \varepsilon, \text{ where } \hat{C}_i = \hat{C}_i^{\mu} P + \hat{C}_i^{\sigma} \odot \varepsilon.$$

Because $\hat{C}_i$ is generated based on the random value $\varepsilon$, in this $\hat{C}_i$ generation method, a value of $\hat{C}_i$ can be diversified, and the neural network obtained by training based on $\hat{C}_i$ has better robustness.

Optionally, the method further includes: determining an estimate $\hat{o}_i$ of the training environment information of the first agent based on the training neighborhood cognition information $\hat{C}_i$ of the first agent; and training the neural network generating $\hat{C}_i$ based on a loss function including $o_i$ and $\hat{o}_i$.

Training the neural network generating $\hat{C}_i$ based on the loss function including $o_i$ and $\hat{o}_i$ can make $o_i$ and $\hat{o}_i$ the same or similar. When $o_i$ and $\hat{o}_i$ are the same or similar, it indicates that $o_i$ can be restored from $\hat{C}_i$, that is, $\hat{C}_i$ is correct cognition of the neighborhood environment.

Optionally, the loss function including $o_i$ and $\hat{o}_i$ is $L2(o_i, \hat{o}_i; w_i)$, L2 represents L2 regularization, and $w_i$ represents the weight of the neural network generating $\hat{C}_i$ based on $o_i$.

Optionally, the method further includes: determining a training Q value of the first agent based on the training individual cognition information and the training neighborhood cognition information of the first agent; and training the first agent based on the training Q value of the first agent.

The Q value reflects the quality of the action generated by the first agent, and training the first agent based on the Q value can improve the quality of the action generated by the first agent.

Optionally, the training the first agent based on the training Q value of the first agent includes: determining Q values $Q_{total}$ of the plurality of agents based on the training Q value of the first agent and a training Q value of the second agent; and training the first agent based on $Q_{total}$.

$Q_{total}$ can better reflect a proportion of a task undertaken by a single agent to tasks undertaken by the plurality of agents, and an action generated based on $Q_{total}$ can enhance global coordination.

Optionally, the target environment information of the first agent is environment information of a communication device or environment information of a mechanical device.

An agent obtained by training according to the method in the first aspect has a high degree of correct cognition on a neighborhood environment, and cognition of the agent on the neighborhood environment is consistent with cognition of another agent in a neighborhood on the neighborhood environment. Therefore, a traffic scheduling instruction generated by the agent obtained by training according to the method in the first aspect can improve collaboration between a plurality of communication devices. A mechanical device scheduling instruction generated by the agent that is generated by training according to the method in the first aspect can improve collaboration between a plurality of mechanical devices.

According to a third aspect, an agent training apparatus is provided, including a unit (e.g., circuit) configured to perform any method in the first aspect.

According to a fourth aspect, an agent-based instruction generation apparatus is provided, including a unit configured to perform any method in the second aspect.

According to a fifth aspect, an agent training device is provided, including a processor and a memory. The memory is configured to store a computer program, and the processor is configured to invoke the computer program from the memory and run the computer program, so that the device performs any method in the first aspect.

According to a sixth aspect, an agent-based instruction generation device is provided, including a processor and a memory. The memory is configured to store a computer program, and the processor is configured to invoke the computer program from the memory and run the computer program, so that the device performs any method in the second aspect.

According to a seventh aspect, a computer program product is provided. The computer program product includes computer program code, and when the computer program code is run by an agent training apparatus, the apparatus is enabled to perform the methods in the first aspect.

According to an eighth aspect, a computer program product is provided. The computer program product includes computer program code, and when the computer program code is run by an agent-based instruction generation apparatus, the apparatus is enabled to perform the methods in the second aspect.

According to a ninth aspect, a computer-readable medium is provided. The computer-readable medium stores program code, and the program code includes instructions used to perform any method in the first aspect.

According to a tenth aspect, a computer-readable medium is provided. The computer-readable medium stores program code, and the program code includes instructions used to perform any method in the second aspect.

BRIEF DESCRIPTION OF DRAWINGS

FIG. 6 is a schematic diagram of an agent-based action generation method according to some embodiments;

FIG. 7 is a schematic diagram of an agent training apparatus according to some embodiments;

DESCRIPTION OF EMBODIMENTS

The following describes the technical solutions of this application with reference to the accompanying drawings.

Figure 1:
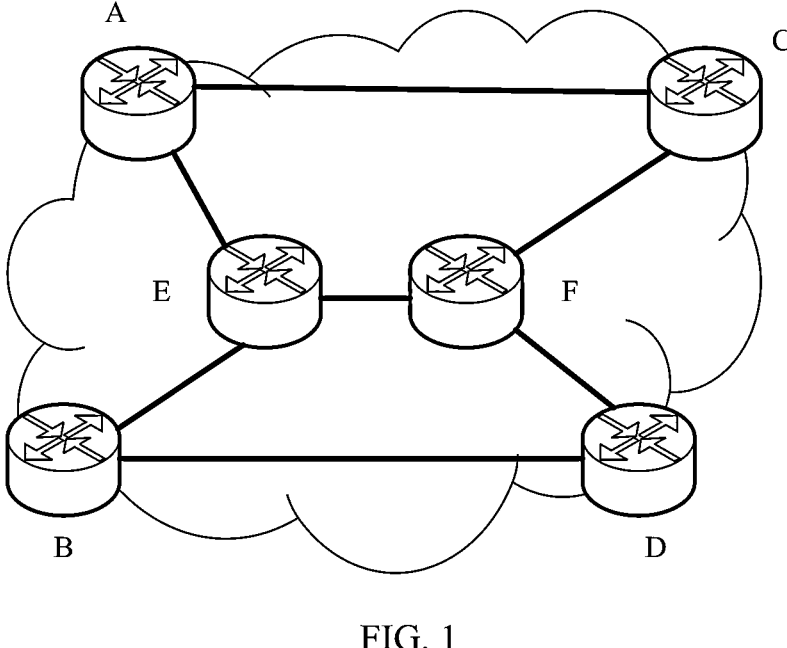
FIG. 1 is a schematic diagram of a multi-agent system according to some embodiments.

FIG. 1 is a schematic diagram of a multi-agent system applicable to some embodiments.

In FIG. 1, A to F represent six routers, and a neural network is deployed on each router. Therefore, one router is equivalent to one agent, and training the agent thereby trains the neural network deployed on the agent. Lines between routers indicate communication lines. A to D are four border routers. Traffic between the border routers is referred to as an aggregation flow. For example, traffic from A to C is an aggregation flow, and traffic from C to A is another aggregation flow.

Aggregation flows between a plurality of routers may be determined by $N_B(N_B-1)$, and the $N_B$ is a quantity of border routers in the plurality of routers. In the system shown in FIG. 1, there are four border routers. Therefore, there are 12 aggregation flows in total in these embodiments of the system.

For each aggregated flow, a multipath routing algorithm gives an available path. The router may determine an available path based on a routing entry (S, D, Nexthop1, rate1%, Nexthop2, rate2%, Nexthop3, rate3%, . . . ), where S represents a start router, D represents a target router, Nexthop1, Nexthop2, and Nexthop3 represent different next hops, rate1%, rate2%, and rate3% represent proportions of forwarded traffic corresponding to different next hops in total forwarded traffic, and a sum of rates is equal to 100%.

A task of the foregoing system is to determine a traffic forwarding policy of any one of the routers A to F.

A method for completing the foregoing task is to regard any router in A to F as one agent, and train the agent so that the agent can make a proper traffic forwarding policy.

The following describes in detail an agent training method according to some embodiments.

Figure 2:
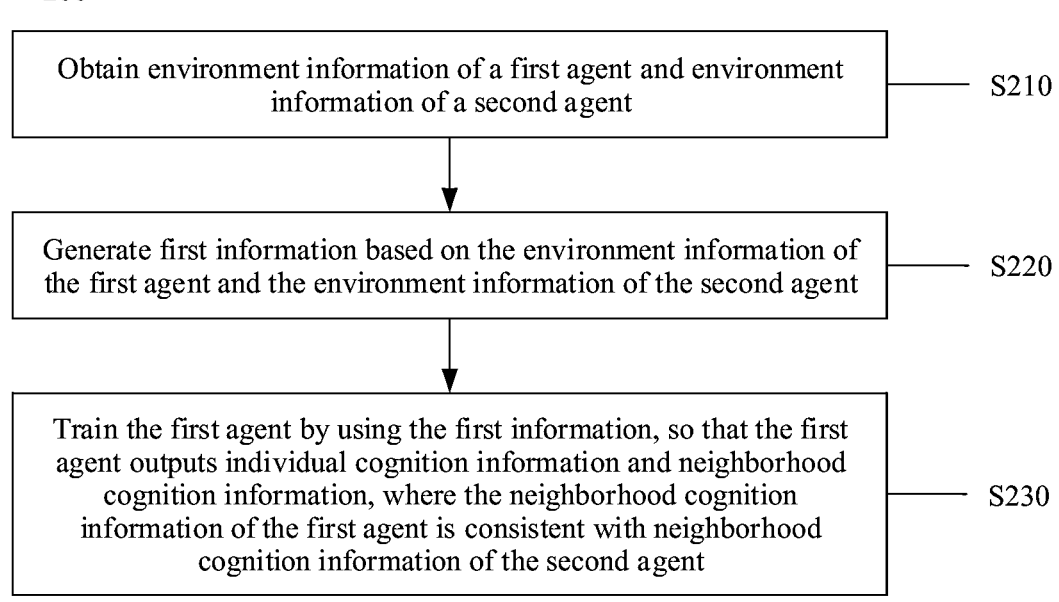
FIG. 2 is a schematic diagram of an agent training method according to some embodiments.

FIG. 2 shows a schematic diagram of an agent training method according to some embodiments. The method 200 may be executed by an agent, or may be executed by a dedicated neural network accelerator, a general-purpose processor, or another apparatus. The following description of the method 200 by using the agent as an execution body is an example, and should not be understood as a limitation on the execution body of the method 200. The method 200 includes the following steps.

S210: Obtain environment information of a first agent and environment information of a second agent.

The first agent may be any router in A to F, and the second agent may be any agent in A to F other than the first agent. In the following, the first agent is referred to as a target agent, and the second agent is referred to as a neighborhood agent. The neighborhood agent of the target agent may be a router that has a direct communication connection with the target agent.

For example, the target agent is the router E, and routers that have direct communication connections with the router E are the router A, the router B, and the router F. Therefore, the three routers may be used as neighborhood agents of the target agent.

Optionally, the neighborhood agent of the target agent may be further determined based on a distance between agents. A method for determining the neighborhood agent of the target agent is not limited in this application.

For ease of description, an agent i is used to represent the target agent, $o_i$ is used to represent environment information of the target agent, an agent j is used to represent the neighborhood agent of the target agent, and $o_j$ is used to represent environment information of the neighborhood agent of the target agent.

For example, $o_i$ or $o_j$ is information such as a cache size of a router, traffic in the cache, load of a direct link in different statistical periods, average load of the direct link in a previous decision period, or a historical decision of the router. Specific content of the environment information is not limited in this application.

After obtaining $o_i$ and $o_j$, the agent i may perform the following steps.

S220: Generate first information based on the environment information of the first agent and the environment information of the second agent.

The agent i may convert $o_i$ into the first information by using a deep neural network. The first information includes abstracted content of $o_i$ and $o_j$, and includes richer content than original environment information ($o_i$ and $o_j$). This improves the accuracy of the decision making process by a neural network.

In this application, terms such as "first" and "second" are used to describe different individuals in objects of a same type. For example, "first information" and "second information" described below represent two different pieces of information. There is no other limitation.

The first information may be generated by the agent i, or may be received by the agent i from another device. For example, after sensing $o_i$, the agent i may generate the first information based on $o_i$, or may send $o_i$ to another device, and after the another device generates the first information based on $o_i$, the agent i receives the first information from the another device.

After obtaining the first information, the agent i may perform the following steps.

S230: Train the first agent by using the first information, so that the first agent outputs individual cognition information and neighborhood cognition information, where the neighborhood cognition information of the first agent is consistent with neighborhood cognition information of the second agent.

The individual cognition information of the target agent may be represented by $A_i$, and the neighborhood cognition information of the target agent may be represented by $\hat{C}_i$. $A_i$ reflects cognition of the agent i on its own condition and $\hat{C}_i$ reflects cognition of the agent i on a surrounding environment. It is assumed that the environment information $o_i$ collected by the agent i is complete. Information in $o_i$ that is the same as or similar to the environment information of the neighborhood agent is neighborhood cognition information, and information in $o_i$ that is different from the environment information of the neighborhood agent is individual cognition information. Because generally, environments of agents in a neighborhood are the same or similar, but individual conditions of different agents are different.

The agent i may input the first information into a cognition neural network to obtain $A_i$ and $\hat{C}_i$. The following describes in detail how to obtain $\hat{C}_i$ that is the same as or similar to $\hat{C}_j$ (e.g., the neighborhood cognition information of the neighborhood agent).

Optionally, other methods may also be used for generating $\hat{C}_i$.

Figure 3:
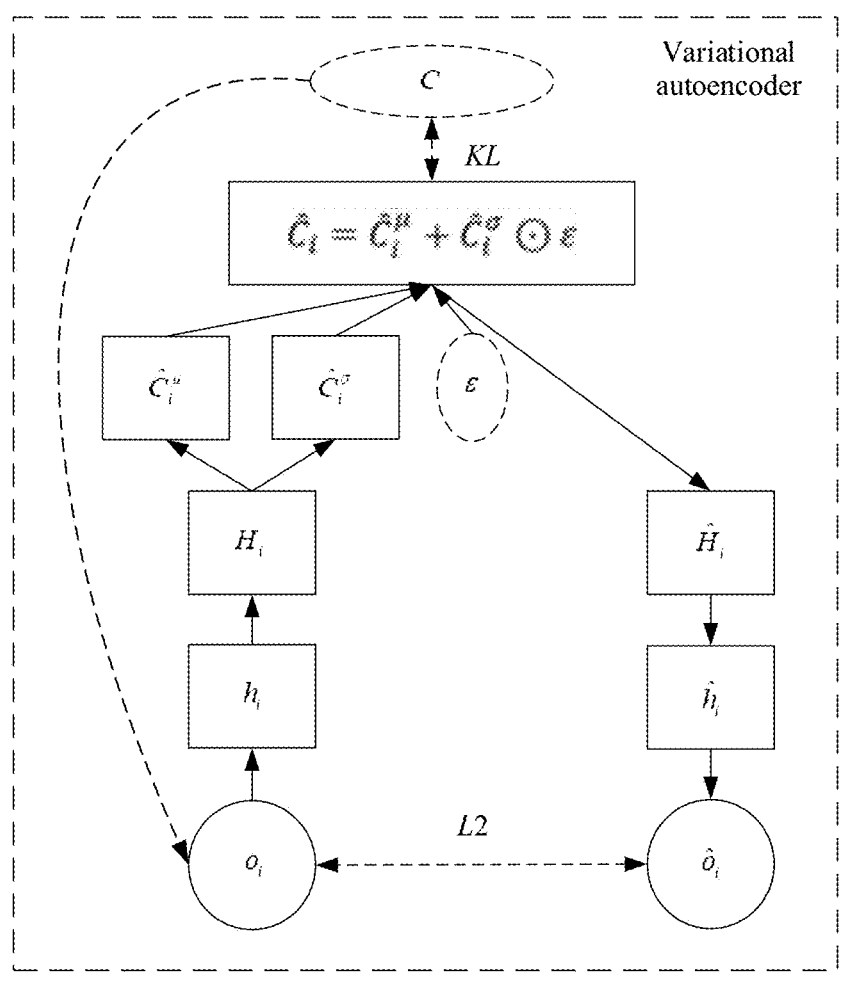
FIG. 3 is a schematic diagram of a method for generating neighborhood cognition information based on a variational autoencoder according to some embodiments.

FIG. 3 shows a $\hat{C}_i$ generation method by using a variational autoencoder (variational autoencoder) according to some embodiments.

First, $o_i$ is input into a fully connected network of the variational autoencoder, $o_i$ is converted into $h_i$ by using the fully connected network, and $h_i$ and $h_j$ are further converted into the first information $H_i$, where $h_j$ is a result obtained after the environment information $o_j$ of the neighborhood agent is abstracted.

Then, a distribution average value $$\hat{C}_i^\mu$$

and a distribution variance $$\hat{C}_i^\sigma$$

of the neighborhood cognition information of the agent i is determined based on the first information; a random value ε is obtained by sampling from a unit Gaussian distribution; and $\hat{C}_i$ is determined based on $$\hat{C}_i^\mu, \hat{C}_i^\sigma, \text{ and } \varepsilon, \text{ where } \hat{C}_i = \hat{C}_i^\mu + \hat{C}_i^\sigma \odot \varepsilon.$$

Because $\hat{C}_i$ is generated based on the random value $\varepsilon$, in this $\hat{C}_i$ generation method, a value of $\hat{C}_i$ can be diversified, and a neural network obtained by training based on $\hat{C}_i$ may be more robust.

In FIG. 3, $\hat{H}_i$ represents a predicted value of $H_i$ determined based on $\hat{C}_i$, $\hat{h}_i$ represents a predicted value of $h_i$ determined based on $\hat{H}_i$, and $\hat{o}_i$ represents a predicted value of $\hat{h}_i$ determined based on $o_i$. By minimizing a loss function (for example, L2) of $o_i$ and $\hat{o}_i$, a neural network generating $\hat{C}_i$ based on $o_i$ can be trained, so that $\hat{C}_i$ is correct cognition of a neighborhood environment. A reason for the advantageous effect is described in detail below.

In addition, in FIG. 3, C represents a true value of the neighborhood cognition information of the agent i. By minimizing a loss function (for example, KL) of C and $\hat{C}_i$, the neural network generating $\hat{C}_i$ based on $o_i$ can be trained, to keep $\hat{C}_i$ consistent with the neighborhood cognition information (for example, $\hat{C}_j$) of the neighborhood agent. This process is shown by a dashed arrow between C and $o_i$. A reason for the advantageous effect is described in detail below.

The foregoing describes in detail a method for determining the individual cognition information $A_i$ and the neighborhood cognition information $\hat{C}_i$ of the target agent based on the first information $H_i$. Generally, a plurality of agents located in one neighborhood has a same as or similar environment. Therefore, cognition of a neighborhood environment by a plurality of agents located in one neighborhood is definitely the same or similar. According to this principle, the neighborhood cognition information $\hat{C}_j$ of the neighborhood agent may be used to train the neural network generating the neighborhood cognition information $\hat{C}_i$ of the target agent, so that $\hat{C}_j$ and $\hat{C}_i$ are the same or similar.

Optionally, the neural network generating $\hat{C}_i$ may be trained based on a loss function including $\hat{C}_j$ and $\hat{C}_i$. For example, the loss function is KL(q($\hat{C}_i|o_i$; $w_i$)‖q($\hat{C}_j|o_j$;$w_j$)). KL represents KL divergence (Kullback-Leibler divergence), q represents a probability distribution, $w_i$ represents a weight of the neural network generating $\hat{C}_i$ based on $o_i$, and $w_j$ represents a weight of the neural network generating $\hat{C}_j$ based on $o_j$. The KL divergence is also referred to as relative entropy, and is used to describe a difference between two probability distributions. Therefore, the KL divergence may be used as the loss function of $\hat{C}_j$ and $\hat{C}_i$.

The KL divergence is used to measure a difference between $\hat{C}_j$ and $\hat{C}_i$. In addition, another method can be further used to measure the difference between $\hat{C}_j$ and $\hat{C}_i$. For example, $\hat{C}_j$ and $\hat{C}_i$ are essentially two vectors, and the difference between $\hat{C}_j$ and $\hat{C}_i$ may be measured by using a method for mathematically representing a distance, such as L1-distance and L2-distance, and the difference between $\hat{C}_j$ and $\hat{C}_i$ is reduced by updating a neural network generating $\hat{C}_j$ or $\hat{C}_i$. L1-distance may be referred to as a Manhattan distance or an L1 norm (L1-Norm), and L2-distance may be referred to as a Euclidean distance or an L2 norm (L2-Norm). In the machine learning field, L1-distance may also be referred to as L1 regularization, and L2-distance may also be referred to as L2 regularization.

As described above, an objective of training the neural network generating $\hat{C}_i$ based on the loss function including $\hat{C}_j$ and $\hat{C}_i$ is to enable a plurality of agents located in one neighborhood to have same or similar cognition of a neighborhood environment. If predicted values of neighborhood cognition information of agents are the same or similar to a true value, cognition of the neighborhood environment by a plurality of agents located in one neighborhood is definitely the same or similar.

Therefore, a neural network generating a predicted value $\hat{C}_i$ may be trained based on a true value C of the neighborhood cognition information of the agent i, so that $\hat{C}_i$ and C are the same or similar.

For example, it may be assumed that C is a standard normal distribution whose average value is $\mu=0$ and variance is $\sigma=1$, and the neural network generating $\hat{C}_i$ is trained by minimizing KL(p(C|$\mu=0,\sigma=1$)‖q($\hat{C}_i|o_i$;$w_i$), so that $\hat{C}_i$ and C are the same or similar, where p represents a prior probability and q represents a posterior probability.

When the neighborhood agent (for example, the agent j) also trains the neural network generating $\hat{C}_j$ based on the method shown in the foregoing example, $\hat{C}_j$ and C generated by the obtained neural network are the same or similar, so that $\hat{C}_j$ and $\hat{C}_i$ are the same or similar, that is, consistency between $\hat{C}_i$ and the neighborhood cognition information (for example, $\hat{C}_j$) of the neighborhood agent may be enhanced. This is also a principle of an advantageous effect of training a neural network by minimizing the loss function of C and $\hat{C}_i$ shown in FIG. 3.

FIG. 3 also discusses training the neural network generating $\hat{C}_i$ based on $o_i$ by minimizing the loss function (for example, L2) of $o_i$ and $\hat{o}_i$. For example, the loss function including $o_i$ and $\hat{o}_i$ is L2($o_i,\hat{o}_i$;$w_i$), where $o_i$ is a true value of the environment information, and $\hat{o}_i$ is a predicted value of the environment information. A specific form of the loss function including $o_i$ and $\hat{o}_i$ is not limited in this application. Training the neural network generating $\hat{C}_i$ based on the loss function including $o_i$ and $\hat{o}_i$ can make $o_i$ and $\hat{o}_i$ the same or similar. When $o_i$ and $\hat{o}_i$ are the same or similar, it indicates that the environment information $o_i$ can be restored from a predicted value $\hat{C}_i$ of the neighborhood cognition information, that is, $\hat{C}_i$ is correct cognition of the neighborhood environment.

After generating the individual cognition information $A_i$ and the neighborhood cognition information $\hat{C}_i$, the target agent may be trained based on the neighborhood cognition information of the target agent.

Optionally, the target agent may be trained by using a Q value training method. A person skilled in the art can realize that, with the development of technologies, other methods that can train the target agent by using the neighborhood cognition information is applicable to this application.

The target agent may first perform a bitwise addition operation on $A_i$ and $\hat{C}_i$. The bitwise addition operation refers to performing an addition operation on elements at corresponding locations in different vectors. For example, $A_i$ is a 3-dimensional vector [0.25, 0.1, 0.3], $\hat{C}_i$ is a 3-dimensional vector [0.1, 0.2, 0.15], and a result of performing the bitwise addition operation on $A_i$ and $\hat{C}_i$ is [0.35, 0.3, 0.45].

A Q value $Q_i$ of the target agent may be generated by using a Q value neural network based on the result obtained after the bitwise addition operation is performed on $A_i$ and $\hat{C}_i$. For example, $Q_i=f(X*W)$. X is the result obtained after the bitwise addition operation is performed on $A_i$ and $\hat{C}_i$, for example, a 3-dimensional vector [0.35, 0.3, 0.45], W is a weight matrix of the Q value neural network, for example, a 3*K-dimensional weight matrix, K is a dimension of $Q_i$ (that is, a quantity of elements in an action set of the agent i), and f(*) is a function for performing a non-linear operation on *. Compared with a linear operation function, the non-linear operation function can enhance an expression capability of the neural network. Common f includes a sigmoid function and a rectified linear activation function (RELU) function.

Optionally, $Q_i$ may be directly generated by combining $A_i$ and $\hat{C}_i$. A specific manner of generating $Q_i$ is not limited in this application.

Then, the target agent may train the target agent by using the Q value.

The Q value is used to evaluate a quality of an action. The target agent can determine a final output action based on Q values corresponding to different actions. After the target agent implements the finally output action, feedback of the action is obtained from an environment, and a neural network generating the action, that is, the target agent, is trained based on the feedback.

For example, a Q value of the agent i is $Q_i$, and the agent i may generate an action based on $Q_i$, where the action is, for example, a traffic scheduling instruction $$a_i^*,$$

and $$a_i^* = \mathrm{argmax}_{a_i} Q_i(o_i, a_i).$$

For example, $$a_i^*$$

is a traffic proportion (rate1%, rate2%, rate3%, . . . ) of an aggregation flow, passing through the router i, on an egress port set, indicates an amount of traffic sent to nodes in (Nexthop1, Nexthop2, Nexthop3, . . . ), $a_i$ indicates a specific action. For example, currently there are four actions (that is, there are four $a_i$), and each action corresponds to one Q value, which are $Q(o,\uparrow)$, $Q(o,\downarrow)$, $Q(o,\leftarrow)$ and $Q(o,\rightarrow)$. The agent i may select an action $$(\text{for example, } a_i^*)$$

with a maximum Q value from the actions for execution. Then, the agent i may minimize a temporal difference (temporal difference, TD) loss function based on feedback of $$a_i^*$$

to train a neural network generating the action.

Because the Q value of the target agent is generated based on $A_i$ and $\hat{C}_i$, the target agent can enhance consistency between $\hat{C}_i$ and the neighborhood cognition information (for example, $\hat{C}_j$) of the neighborhood agent by training the neural network generating $\hat{C}_i$. In addition, the target agent can improve a degree of correct cognition of the target agent on the neighborhood environment by training the neural network generating $\hat{C}_i$, thereby improving accuracy of the Q value. Compared with a neural network training method in which Q is directly generated based on the first information, an action generated by a neural network obtained through training according to the method 200 can improve collaboration between a plurality of agents.

Figure 4:
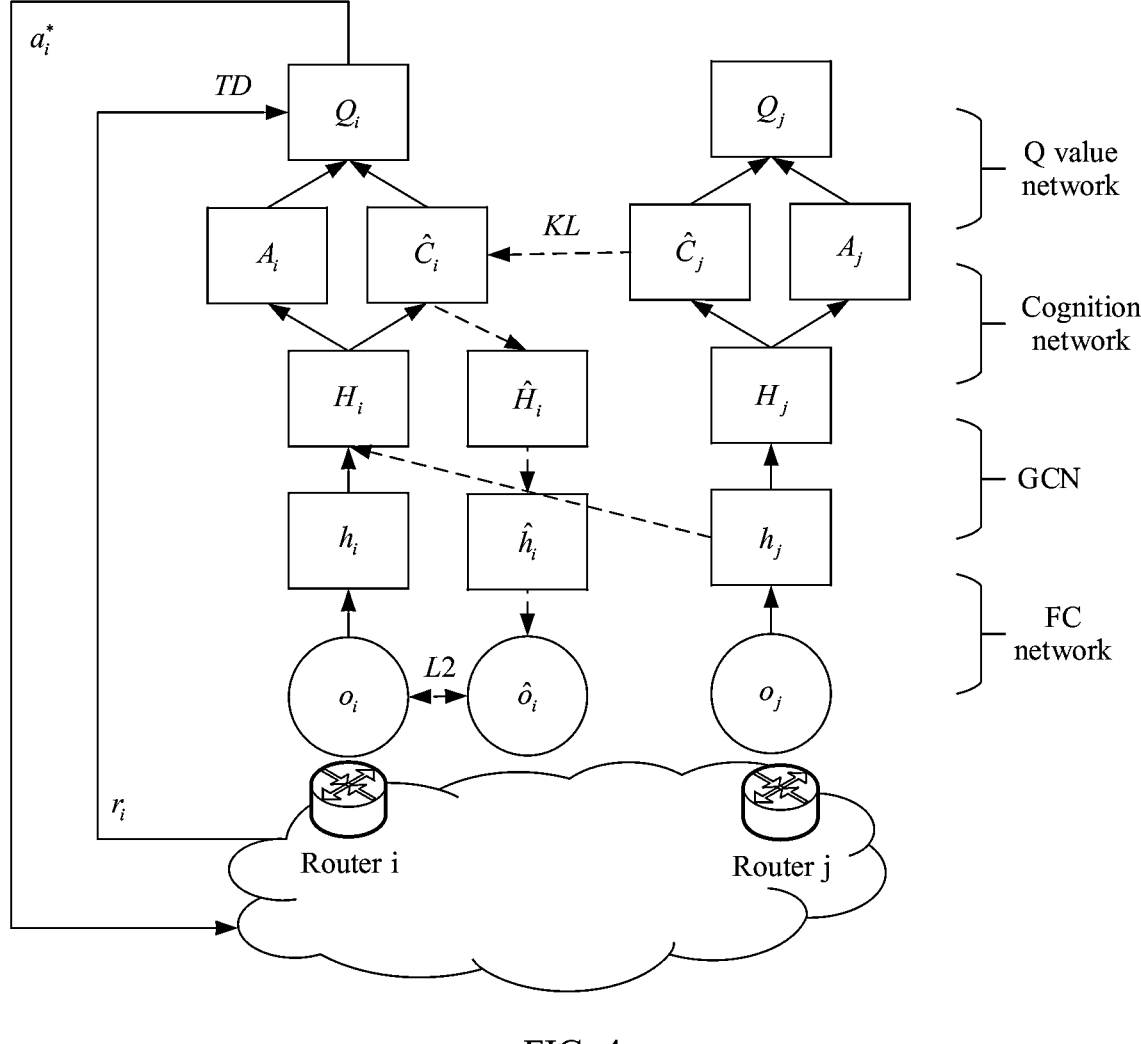
FIG. 4 is a schematic diagram of another agent training method according to some embodiments.

Refer to FIG. 4. The following further describes an agent training method according to this application. The method shown in FIG. 4 may be performed by a router i. The router i is an example of the agent i described above, and may be any one of the six routers shown in FIG. 1. A router j is one neighborhood router of the router i. The router i may perform the following steps.

Step 1: The router i senses environment information $o_i$.

Step 2: The router i processes $o_i$ into $h_i$ by using a fully connected (FC) network. $h_i$ may be referred to as second information of the router i, and represents information obtained based on $o_i$ after abstraction.

Step 3: The router i obtains second information of all neighborhood routers. The neighborhood router of the router i may be represented as $j \in N(i)$, where $N(i)$ is a set of all the neighborhood routers of the router i, and j is one in the set, that is, the router j. Environment information of the router j is $o_j$, and the router j may process $o_j$ into $h_j$ by using the FC network of the router j. $h_j$ is second information of the router j.

The router i may process $h_i$ and the second information of the neighborhood router into first information $H_i$ of the router i by using a graph convolutional network (graph convolutional network, GCN), and may perform a weighted sum operation on $h_i$ and the second information of all the neighborhood routers of the router i to obtain $H_i$. For example, all the neighborhood routers of the router i may be represented as $N(i)$, and the first information of the router i may be determined according to the following formula:

$$H_i = \sigma\left(w \sum_{j \in N(i) \cup \{i\}} \frac{h_j}{\sqrt{|N(j)||N(i)|}}\right) \quad (1)$$

σ represents a non-linear function, and is used to improve an expression capability of a neural network; W represents a weight of the GCN; $\cup$ is a union set symbol; {i} represents the router i; $|N(j)|$ represents a quantity of all neighborhood routers of the router j; and $|N(i)|$ represents a quantity of all the neighborhood routers of the router i.

There are two optional methods in a process of generating $H_i$ based on $h_i$ and $h_j$.

In a first method, $h_i$ and $h_j$ are first processed (for example, combined or a weighted sum operation is performed) to obtain a larger matrix, and then a matrix multiplication operation is performed on the matrix to obtain $H_i$.

In a second method, a multiplication operation is performed on $h_i$ and a first matrix to obtain a first result, a multiplication operation is performed on $h_j$ and a second matrix to obtain a second result, and then $H_i$ is generated based on the first result and the second result. For example, a weighted sum operation is performed on the first result and the second result or they are combined, to obtain $H_i$.

Because $h_i$ and $h_j$ are two small-sized matrices, compared with the first method, the second method can reduce an amount of computation required for generating $H_i$. In addition, the first matrix and the second matrix may be a same matrix, or may be different matrices. When the first matrix is the same as the second matrix, $h_i$ and $h_j$ share a same set of parameters, which helps a GCN learn more content.

Step 4: The router i processes $H_i$ into $A_i$ and $\hat{C}_i$ by using a cognition (cognition) network.

Step 5: The router i generates $\hat{o}_i$ based on $\hat{C}_i$. $\hat{H}_i$ represents a predicted value of $H_i$ determined based on $\hat{C}_i$, $\hat{h}_i$ represents a predicted value of $h_i$ determined based on $\hat{H}_i$, and $\hat{o}_i$ represents a predicted value of $\hat{h}_i$ determined based on $\hat{o}_i$. By minimizing a loss function (for example, L2) of $o_i$ and $\hat{o}_i$, a neural network generating $\hat{C}_i$ based on $o_i$ can be trained, so that $\hat{C}_i$ is correct cognition of a neighborhood environment. The neural network generating $\hat{C}_i$ based on $o_i$ is, for example, one or more of the FC network, the GCN, and the cognition network shown in FIG. 4.

Step 6: The router i obtains neighborhood cognition information of all the neighborhood routers, and minimizes a loss function including $\hat{C}_i$ and the neighborhood cognition information of all the neighborhood routers, so that $\hat{C}_i$ is consistent with the neighborhood cognition information of all the neighborhood routers.

For example, after obtaining neighborhood cognition information $\hat{C}_j$, of the router j, the router i may minimize $KL(q(\hat{C}_i|o_i; w_i)\|q(\hat{C}_j|o_j;w_j))$ to make $\hat{C}_i$ and $\hat{C}_j$ consistent (the same or similar). $w_i$ represents a weight of the neural network generating $\hat{C}_i$ based on $o_i$, and $w_j$ represents a weight of the neural network generating $\hat{C}_j$ based on $o_j$. The neural network generating $\hat{C}_i$ based on $o_i$ is, for example, one or more of the FC network, the GCN, and the cognition network shown in FIG. 4.

It should be noted that, for brevity, a neural network of the router i and a neural network of the router j are not distinguished in FIG. 4. Actually, an FC network, a GCN, a cognition network, and a Q value network are separately deployed on the router i and the router j. In addition, because environment information of the router i and the router j are usually not completely the same, training results of the neural networks separately deployed on the router i and the router j are typically different.

Step 7: The router i performs a bitwise addition operation on $A_i$ and $\hat{C}_i$ by using the Q value network, to obtain a Q value $Q_i$.

Step 8: The router i generates an action based on $Q_i$, where the action is, for example, a traffic scheduling instruction $$a_i^*,$$

and $$a_i^* = \mathrm{argmax}_{a_i} Q_i(o_i, a_i).$$

For example, $$a_i^*$$

is a traffic proportion (rate1%, rate2%, rate3%, . . . ) of an aggregation flow, passing through the router i, on an egress port set, and indicates an amount of traffic sent to nodes in (Nexthop1, Nexthop2, Nexthop3, . . . ).

Step 9: The router i may obtain feedback $r_i$ of $$a_i^*$$

from an environment, minimizes a TD loss function based on $r_i$, and sends back gradient generated by minimizing the TD loss function to train the agent i, to obtain accurate $Q_i$ or $$a_i^*.$$

A neural network generating the action is, for example, one or more of the FC network, the GCN, the cognition network, and the Q value network shown in FIG. 4.

Each agent i may be trained according to formula (2).

$$L^{total}(w) = L^{td}(w) + \alpha \sum_{i=1}^{N} L_i^{cd}(w) \tag{2}$$

$L^{total}(w)$ is a weighted sum of the TD loss function $L^{td}(w)$ and a cognition-dissonance (cognition-dissonance, CD) loss function $$L_i^{cd}(w) \cdot L_i^{cd}(w)$$

is used to reduce a cognition-dissonance loss, that is, to make cognition of a plurality of agents consistent; $\alpha$ is a real number, and represents a weight coefficient of $$L_i^{cd}(w);$$

w represents a set of parameters of all agents (a parameter $w_i$ of the agent i are a part of the set); and N represents that there are a total of N agents in a multi-agent system. The N agents share one TD loss function, and each of the N agents has its own CD loss function.

$L^{td}(w)$ may be determined according to formula (3).

$$L^{td}(w) = E_{(\vec{o},\vec{a},r,\vec{o}')}\left[\left(y_{total} - Q_{total}(\vec{o}, \vec{a}; w)\right)^2\right] \tag{3}$$

$E_{(\vec{o},\vec{a},r,\vec{o}')}$ [expression] represents performing a sampling operation on $(\vec{o}, \vec{a}, r, \vec{o}')$, and then calculating an expected value of expression based on all samples $(\vec{o}, \vec{a}, r, \vec{o}')$; $\vec{o}$ represents joint observation of all the agents, that is, $\vec{o} = \langle o_1, o_2, \ldots, o_N \rangle$; $\vec{a}$ represents a joint action of all the agents, that is, $\vec{a} = \langle a_1, a_2, \ldots, a_N \rangle$; r represents a reward value fed back by the environment to all the agents after all the agents perform the joint action d with the joint observation $\vec{o}$; $\vec{o}'$ represents new joint observation fed back by the environment to all the agents after all the agents perform the joint action $\vec{a}$ with the joint observation $\vec{o}$; $Q_{total}$ represents Q values of the plurality of agents; and $y_{total}$ may be determined according to formula (4).

$$y_{total} = r + \gamma \max_{\vec{a}'} Q_{total}(\vec{o}', \vec{a}'; w^-) \tag{4}$$

$\gamma$ represents areal number; $\vec{a}'$ represents a joint action performed by all of the agents under the new joint observation $\vec{o}$'; and $w^-$ represents a parameter of a target neural network, which is identical to w before training starts. There are two update manners in a training process: (1) No update is performed in S training steps, and after the S training steps end, a value of w is assigned to $w^-$. (2) An update is performed in each training step, and an update manner is $w^-=\beta w^-+(1-\beta)w$, where $\beta$ is a real number used to control an update rate of $w^-$ (it should be noted that w is updated in each training step regardless of an update manner of $w^-$, and an update manner is a total loss function L-total defined based on formula (2)).

$$L_i^{cd}(w)$$

in formula (2) may be determined according to formula (5).

$$L_i^{cd}(w) = E_{o_i}\big[L2(o_i, \hat{o}_i; w) + KL\big(q(\hat{C}_i|o_i; w)\|p(C)\big)\big] \qquad (5)$$
$$\approx E_{o_i}\bigg[L2(o_i, \hat{o}_i; w) + \frac{1}{|N(i)|}\sum_{j\in N(i)} KL\big(q(\hat{C}_i|o_i; w)\|q(\hat{C}_j|o_j; w)\big)\bigg]$$

It should be noted that W in formula (5) represents the set of parameters of all the agents. Therefore, it is not further distinguished that the parameter $w_i$ of the agent i is a part of the set.

Formula (2) to formula (5) are examples of formulas used when the neural network generating $\hat{C}_i$ and the agent i are synchronously trained. Optionally, the router i may first complete training of the neural network generating $\hat{C}_i$, then generate $Q_i$ based on $\hat{C}_i$ generated by the neural network, and train the agent i based on $Q_i$.

In addition to training the agent by using $Q_i$, the router i may also use $Q_i$ and another Q value to train the agent.

Figure 5:
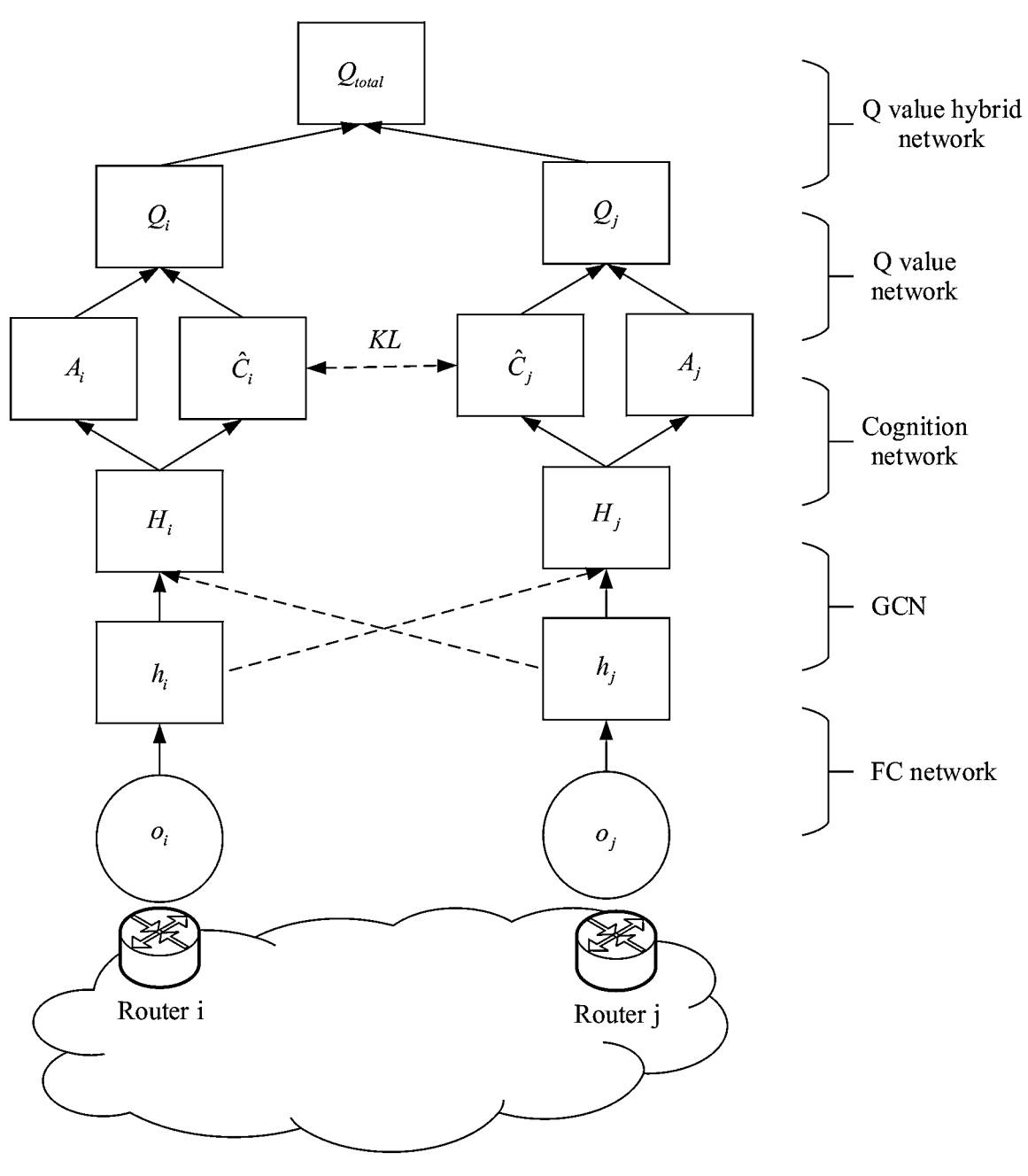
FIG. 5 is a schematic diagram of an agent training method using a plurality of Q values according to some embodiments.

FIG. 5 shows an agent training method using a plurality of Q values according to some embodiments.

Compared with FIG. 4, one more Q value hybrid network is deployed for the router i in FIG. 5. The network is used to process Q values of a plurality of routers into $Q_{total}$. The plurality of routers may be routers belonging to one neighborhood, or may be routers belonging to a plurality of neighborhoods. For example, the Q value hybrid network may perform weighting and calculation on $Q_i$ and $Q_j$ (a Q value of a router j). In this way, $Q_{total}$ can better reflect a proportion of a task undertaken by a single router to tasks undertaken by the plurality of routers, and an action generated based on $Q_{total}$ can enhance global coordination.

The foregoing describes in detail the agent training method provided in this application. After agent training is converged, an agent may generate an action according to the method shown in FIG. 6. The method 600 may include the following steps.

S610: An agent i senses environment information.

S620: The agent i processes the environment information into second information by using an FC network.

S630: The agent i obtains second information of all neighborhood agents, and processes all the second information into first information by using a GCN.

S640: The agent i processes the first information by using a cognition network, and generates individual cognition information and neighborhood cognition information.

S650: The agent i performs a bitwise addition operation on the individual cognition information and the neighborhood cognition information by using a Q value network, and generates a Q value based on a result of the operation.

S660: The agent i generates an action (for example, a flow scheduling instruction) based on the Q value, and applies the action to an environment.

Compared with the method 200, the method 600 does not need to update a parameter of the agent. In addition, an environment in which the agent i in the method 600 is located may change compared with an environment in which the agent i in the method 200 is located. Therefore, all information in the method 600 may be different from all information in the method 200. The information in the method 600 may be referred to as target information, and the information in the method 200 may be referred to as training information. For example, the environment information, the first information, the second information, the individual cognition information, and the neighborhood cognition information in the method 600 may be respectively referred to as target environment information, target first information, target second information, target individual cognition information, and target neighborhood cognition information; and the environment information, the first information, the second information, the individual cognition information, and the neighborhood cognition information in the method 200 may be respectively referred to as training environment information, first training information, second training information, training individual cognition information, and training neighborhood cognition information.

An agent obtained by training according to the method 200 may have a high degree of correct cognition on a neighborhood environment, and cognition of the agent obtained by training according to the method 200 on the neighborhood environment is consistent with cognition of another agent in a neighborhood on the neighborhood environment. Therefore, the action generated by the agent in the method 600 can improve collaboration between the plurality of agents.

The foregoing describes in detail examples of the agent training method and the agent-based action generation method that are provided in this application. It can be understood that, to implement the foregoing functions, a corresponding apparatus includes a corresponding hardware structure and/or software module for executing each function. A person skilled in the art should be easily aware that, with reference to units, circuits, and algorithm steps in the examples described in embodiments disclosed in this specification, this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, an agent training apparatus and an agent-based action generation apparatus may be divided into functional units according to the foregoing method, for example, each functional unit may be obtained through division based on each corresponding function, or two or more functions may be integrated into one processing module. The integrated unit may be implemented in a form of hardware (e.g., circuits), or may be implemented in a form of a software functional unit. It should be noted that, in this application, division into the units is an example, and is merely a logical function division. During actual implementation, another division manner may be implemented.

FIG. 7 is a schematic diagram of a structure of an agent training apparatus according to some embodiments. The apparatus 700 includes a processing unit (e.g., a processing circuit) 710 and a communication unit (e.g., a communication circuit) 720. The communication unit 720 can perform a sending step and/or a receiving step under control of the processing unit 710.

The communication unit 720 is configured to obtain environment information of a first agent and environment information of a second agent.

The processing unit 710 is configured to: generate first information based on the environment information of the first agent and the environment information of the second agent; and train the first agent by using the first information, so that the first agent outputs individual cognition information and neighborhood cognition information. The neighborhood cognition information of the first agent is consistent with neighborhood cognition information of the second agent.

Optionally, the processing unit 710 is specifically configured to: generate second information $h_i$ of the first agent based on the environment information of the first agent; generate second information $h_j$ of the second agent based on the environment information of the second agent; and generate the first information based on $h_i$ and $h_j$.

Optionally, the processing unit 710 is specifically configured to: determine a first result based on a product of $h_i$ and a first matrix; determine a second result based on a product of $h_j$ and a second matrix; and generate the first information based on the first result and the second result.

Optionally, the communication unit 720 is further configured to obtain the neighborhood cognition information $\hat{C}_j$ of the second agent; and the processing unit 710 is further configured to train a neural network generating the neighborhood cognition information $\hat{C}_i$ of the first agent based on the neighborhood cognition information $\hat{C}_j$ of the second agent, so that $\hat{C}_j$ is consistent with $\hat{C}_i$.

Optionally, the processing unit 710 is specifically configured to train the neural network generating $\hat{C}_i$ based on a loss function including $\hat{C}_j$ and $\hat{C}_i$.

Optionally, the loss function including $\hat{C}_j$ and $\hat{C}_i$ is KL(q $(\hat{C}_i|o_i;\ w_i)\|q(\hat{C}_j|o_j;w_j))$. KL represents KL divergence, q represents a probability distribution, $o_i$ represents the environment information of the first agent, $w_i$ represents a weight of the neural network generating $\hat{C}_i$ based on $o_i$, $o_j$ represents the environment information of the second agent, and $w_j$ represents a weight of the neural network generating $\hat{C}_j$ based on $o_j$.

Optionally, the processing unit 710 is configured to determine the neighborhood cognition information $\hat{C}_i$ of the first agent based on the first information and a variational auto-encoder.

Optionally, the processing unit 710 is configured to: determine a distribution average value $$\hat{C}_i^{\mu}$$

and a distribution variance $$\hat{C}_i^{\sigma}$$

of the neighborhood cognition information of the first agent based on the first information; obtain a random value E by sampling from a unit Gaussian distribution; and determine $\hat{C}_i$ based on $$\hat{C}_i^{\mu},\ \hat{C}_i^{\sigma},\ \text{and}\ \varepsilon,\ \text{where}\ \hat{C}_i = \hat{C}_i^{\mu} + \hat{C}_i^{\sigma} \square\, \varepsilon.$$

Optionally, the communication unit 720 is further configured to determine an estimate $\hat{o}_i$ of the environment information of the first agent based on the neighborhood cognition information $\hat{C}_i$ of the first agent; and the processing unit 710 is further configured to train the neural network generating $\hat{C}_i$ based on a loss function including $o_i$ and $\hat{o}_i$.

Optionally, the loss function including $o_i$ and $\hat{o}_i$ is L2($o_i$, $\hat{o}_i$;$w_i$), L2 represents L2 regularization, and $w_i$ represents the weight of the neural network generating $\hat{C}_i$ based on $o_i$.

Optionally, the processing unit 710 is further configured to: determine a Q value of the first agent based on the individual cognition information and the neighborhood cognition information of the first agent; and train the first agent based on the Q value of the first agent.

Optionally, the processing unit 710 is configured to: determine Q values $Q_{total}$ of a plurality of agents based on the Q value of the first agent and a Q value of the second agent; and train the first agent based on $Q_{total}$.

For a manner in which the apparatus 700 performs the agent training method and an advantageous effect generated by the method, refer to related descriptions in the method embodiments.

Figure 8:
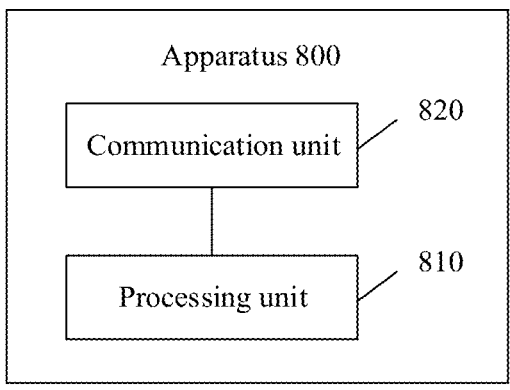
FIG. 8 is a schematic diagram of an agent-based action generation apparatus according to some embodiments.

FIG. 8 is a schematic diagram of a structure of an agent-based instruction generation apparatus according to some embodiments. The apparatus 800 includes a processing unit (e.g., processing circuit) 810 and a communication unit (e.g., communication circuit) 820. The communication unit 820 can perform a sending step and/or a receiving step under control of the processing unit 810.

The communication unit 820 is configured to obtain target environment information of a first agent and target environment information of a second agent.

The processing unit 810 is configured to: generate target first information based on the target environment information of the first agent and the target environment information of the second agent; output target individual cognition information and target neighborhood cognition information of the first agent based on the target first information, where the target neighborhood cognition information of the first agent is consistent with target neighborhood cognition information of the second agent; and generate an instruction based on the target individual cognition information and the target neighborhood cognition information of the first agent.

Optionally, the processing unit 810 is configured to: generate target second information of the first agent based on the target environment information of the first agent; generate target second information of the second agent based on the target environment information of the second agent; and generate the target first information based on the target second information of the first agent and the target second information of the second agent.

Optionally, the processing unit 810 is configured to: generate a target Q value based on the target individual cognition information of the first agent and target neighborhood information of a target agent; and generate the instruction based on the target Q value.

Optionally, the communication unit 820 is further configured to obtain training environment information of the first agent and training environment information of the second agent; and the processing unit 810 is further configured to: generate first training information based on the training environment information of the first agent and the training environment information of the second agent; and train the first agent by using the first training information, so that the first agent outputs training individual cognition information and training neighborhood cognition information, where the training neighborhood cognition information of the first agent is consistent with training neighborhood cognition information of the second agent.

Optionally, the processing unit 810 is configured to: generate second training information $h_i$ of the first agent based on the training environment information of the first agent; generate second training information $h_j$ of the second agent based on the training environment information of the second agent; and generate the first training information based on $h_i$ and $h_j$.

Optionally, the processing unit 810 is configured to: determine a first result based on a product of $h_i$ and a first matrix; determine a second result based on a product of $h_j$ and a second matrix; and generate the first training information based on the first result and the second result.

Optionally, the communication unit 820 is further configured to obtain the training neighborhood cognition information $\hat{C}_j$ of the second agent; and the processing unit 810 is further configured to train a neural network generating the training neighborhood cognition information $\hat{C}_i$ of the first agent based on the neighborhood cognition information $\hat{C}_j$ of the second agent, so that $\hat{C}_j$ is consistent with $\hat{C}_i$.

Optionally, the processing unit 810 is configured to train the neural network generating $\hat{C}_i$ based on a loss function including $\hat{C}_j$ and $\hat{C}_i$.

Optionally, the loss function including $\hat{C}_j$ and $\hat{C}_i$ is $KL(q(\hat{C}_i|o_i;\ w_i)\|q(\hat{C}_j|o_j;w_j))$. KL represents KL divergence, q represents a probability distribution, $o_i$ represents the training environment information of the first agent, $w_i$ represents a weight of the neural network generating $\hat{C}_i$ based on $o_i$, $o_j$ represents the training environment information of the second agent, and $w_j$ represents a weight of the neural network generating $\hat{C}_j$ based on $o_j$.

Optionally, the processing unit 810 is configured to determine the training neighborhood cognition information $\hat{C}_i$ of the first agent based on the first training information and a variational autoencoder.

Optionally, the processing unit 810 is configured to: determine a distribution average value $$\hat{C}_i^\mu$$

and a distribution variance $$\hat{C}_i^\sigma$$

of the training neighborhood cognition information of the first agent based on the first training information; obtain a random value $\varepsilon$ by sampling from a unit Gaussian distribution; and determine $\hat{C}_i$ based on $$\hat{C}_i^\mu, \hat{C}_i^\sigma, \text{ and } \varepsilon, \text{ where } \hat{C}_i = \hat{C}_i^\mu + \hat{C}_i^\sigma \square \varepsilon.$$

Optionally, the processing unit 810 is further configured to: determine an estimate $\hat{o}_i$ of the training environment information of the first agent based on the training neighborhood cognition information $\hat{C}_i$ of the first agent; and train the neural network generating $\hat{C}_i$ based on a loss function including $o_i$ and $\hat{o}_i$.

Optionally, the loss function including $o_i$ and $\hat{o}_i$ is $L2(o_i, \hat{o}_i;w_i)$, L2 represents L2 regularization, and $w_i$ represents the weight of the neural network generating $\hat{C}_i$ based on $o_i$.

Optionally, the processing unit 810 is further configured to: determine a training Q value of the first agent based on the training individual cognition information and the training neighborhood cognition information of the first agent; and train the first agent based on the training Q value of the first agent.

Optionally, the processing unit 810 is configured to: determine training Q values $Q_{total}$ of a plurality of agents based on the training Q value of the first agent and a training Q value of the second agent; and train the first agent based on $Q_{total}$.

For a manner in which the apparatus 800 performs the agent training method and an advantageous effect generated by the method, refer to related descriptions in the method embodiments.

Optionally, the apparatus 800 and the apparatus 700 are a same apparatus.

Figure 9:
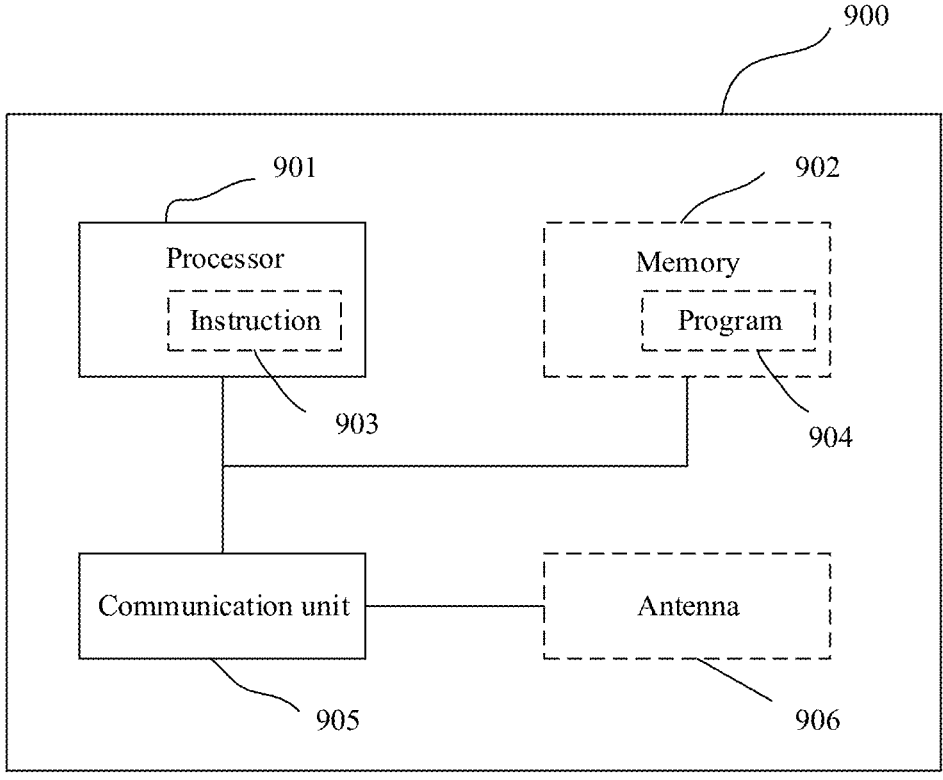
FIG. 9 is a schematic diagram of an electronic device according to some embodiments.

FIG. 9 shows a schematic diagram of a structure of an electronic device according to some embodiments. A dashed line in FIG. 9 indicates that the unit or the module is optional. A device 900 may be configured to implement the method described in the foregoing method embodiments. The device 900 may be a terminal device, a server, or a chip.

The device 900 includes one or more processors 901. The one or more processors 901 may support the device 900 in implementing the methods in the method embodiments corresponding to FIG. 2 to FIG. 6. The processor 901 may be a general-purpose processor or a dedicated processor. The processor 901 may be a central processing unit (central processing unit, CPU). The CPU may be configured to control the device 900, execute a software program, and process data of the software program. The device 900 may further include a communication unit 905, configured to input (receive) and output (send) a signal.

For example, the device 900 may be a chip, and the communication unit 905 may be an input circuit and/or an output circuit of the chip, or the communication unit 905 may be a communication interface of the chip. The chip may be used as a component of a terminal device, a network device, or another electronic device.

For another example, the device 900 may be a terminal device or a server, and the communication unit 905 may be a transceiver of the terminal device or the server, or the communication unit 905 may be a transceiver circuit of the terminal device or the server.

The device 900 may include one or more memories 902. The memory 902 stores a program 904, and the program 904 may be run by the processor 901 to generate an instruction 903, so that the processor 901 performs, based on the instruction 903, the methods described in the foregoing method embodiments. Optionally, the memory 902 may further store data. Optionally, the processor 901 may further read the data stored in the memory 902. The data and the program 904 may be stored in a same storage address, or the data and the program 904 may be stored in different storage addresses.

The processor 901 and the memory 902 may be separately disposed, or may be integrated together, for example, may be integrated on a system on chip (system on chip, SOC) of a terminal device.

The device 900 may further include an antenna 906. The communication unit 905 is configured to implement a receiving and sending function of the device 900 by using the antenna 906.

For a manner in which the processor 901 performs the agent training method, refer to related descriptions in the method embodiment.

It should be understood that the steps in the foregoing method embodiments may be implemented by using a logic circuit in a form of hardware or an instruction in a form of software in the processor 901. The processor 901 may be a CPU, a digital signal processor (digital signal processor, DSP), an application-specific integrated circuit (application-specific integrated circuit, ASIC), or a field programmable gate array (field programmable gate array, FPGA) or another programmable logic device such as a discrete gate, a transistor logic device, or a discrete hardware component.

This application further provides a computer program product. When the computer program product is executed by the processor 901, the method according to any method embodiment of this application is implemented.

The computer program product such as the program 904 may be stored in the memory 902. After being preprocessed, compiled, assembled, linked, and the like, the program 904 is finally converted into an executable target file that can be executed by the processor 901.

This application further provides a computer-readable storage medium, which stores a computer program. When the computer program is executed by a computer, the method according to any method embodiment of this application is implemented. The computer program may be a high-level language program, or may be an executable target program.

The computer-readable storage medium is, for example, the memory 902. The memory 902 may be a volatile memory or a nonvolatile memory, or the memory 902 may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external high-speed cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for ease and brevity of description, for a specific working process and a generated technical effect of the foregoing apparatus and device, refer to a corresponding process and technical effect in the foregoing method embodiments, and details are not described herein again.

In the several embodiments provided in this application, the disclosed system, apparatus and method may be implemented in other manners. For example, some features of the method embodiments described above may be ignored or not performed. The described apparatus embodiments are merely examples. Division into the units is merely logical function division and may be other division in actual implementation. A plurality of units or components may be combined or integrated into another system. In addition, coupling between the units or coupling between the components may be direct coupling or indirect coupling, and the coupling may include an electrical connection, a mechanical connection, or another form of connection.

It needs to be understood that sequence indexes of the foregoing processes do not mean execution sequences in the embodiments of this application. The execution sequences of the processes need to be determined based on functions and internal logic of the processes, and do not need to be construed as any limitation on the implementation processes of embodiments of this application.

In addition, the terms "system" and "network" are usually used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally represents an "or" relationship between the associated objects.

In summary, what is described above is merely example embodiments of the technical solutions of this application, but is not intended to limit the protection scope of this application. Any modification, equivalent replacement, or improvement made without departing from the spirit and principle of this application shall fall within the protection scope of this application.

What is claimed is:

1. An agent training method, comprising:
obtaining environment information of a first agent and environment information of a second agent;
generating first information based on the environment information of the first agent and the environment information of the second agent; and
training the first agent by using the first information, so that the first agent outputs individual cognition information and neighborhood cognition information $\hat{C}_i$, wherein the neighborhood cognition information of the first agent $\hat{C}_i$ is consistent with neighborhood cognition information of the second agent $\hat{C}_j$.

2. The method according to claim 1, wherein generating first information based on the environment information of the first agent and the environment information of the second agent comprises:
generating second information $h_i$ of the first agent based on the environment information of the first agent;
generating second information $h_j$ of the second agent based on the environment information of the second agent; and
generating the first information based on $h_i$ and $h_j$.

3. The method according to claim 2, wherein generating the first information based on $h_i$ and $h_j$ comprises:
determining a first result based on a product of $h_i$ and a first matrix;
determining a second result based on a product of $h_j$ and a second matrix; and
generating the first information based on the first result and the second result.

4. The method according to claim 1, wherein the method further comprises:

obtaining the neighborhood cognition information $\hat{C}_j$ of the second agent; and training a neural network generating the neighborhood cognition information $\hat{C}_i$ of the first agent based on the neighborhood cognition information $\hat{C}_j$ of the second agent, so that $\hat{C}_j$ is consistent with $\hat{C}_i$.

5. The method according to claim 4, wherein training a neural network generating the neighborhood cognition information $\hat{C}_i$ of the first agent based on the neighborhood cognition information $\hat{C}_j$ of the second agent comprises:

training the neural network generating $\hat{C}_i$ based on a loss function comprising $\hat{C}_j$ and $\hat{C}_i$.

6. The method according to claim 1, wherein training the first agent by using the first information, so that the first agent outputs individual cognition information and neighborhood cognition information comprises:

determining the neighborhood cognition information $\hat{C}_i$ of the first agent based on the first information and a variational autoencoder.

7. The method according to claim 1, wherein the method further comprises: determining an estimate $\hat{o}_j$ of the environment information of the first agent based on the neighborhood cognition information $\hat{C}_i$ of the first agent; and training the neural network generating C, based on a loss function comprising $\hat{o}_i$.

8. The method according to claim 1, wherein the method further comprises:

determining a Q value of the first agent based on the individual cognition information and the neighborhood cognition information of the first agent; and training the first agent based on the Q value of the first agent.

9. The method according to claim 8, wherein training the first agent based on the Q value of the first agent comprises:

determining Q values $Q_{total}$ of a plurality of agents based on the Q value of the first agent and a Q value of the second agent; and training the first agent based on $Q_{total}$.

10. The method according to claim 1, wherein the method further comprises: generating an instruction based on the target individual cognition information and the target neighborhood cognition information of the first agent.

11. An agent training apparatus, comprising a communication circuit and a processing circuit, wherein:

the communication circuit is configured to obtain environment information of a first agent and environment information of a second agent; and the processing circuit is configured to: generate first information based on the environment information of the first agent and the environment information of the second agent; and train the first agent by using the first information, so that the first agent outputs individual cognition information and neighborhood cognition information $\hat{C}_i$, wherein the neighborhood cognition information of the first agent $\hat{C}_i$ is consistent with neighborhood cognition information of the second agent $\hat{C}_j$.

12. The apparatus according to claim 11, wherein the processing circuit is configured to:

generate second information $h_i$ of the first agent based on the environment information of the first agent;

generate second information $h_j$ of the second agent based on the environment information of the second agent; and generate the first information based on $h_i$ and $h_j$.

13. The apparatus according to claim 12, wherein the processing circuit is configured to:

determine a first result based on a product of $h_i$ and a first matrix;

determine a second result based on a product of $h_j$ and a second matrix; and generate the first information based on the first result and the second result.

14. The apparatus according to claim 11, wherein:

the communication circuit is further configured to obtain the neighborhood cognition information $\hat{C}_j$ of the second agent; and the processing circuit is further configured to train a neural network generating the neighborhood cognition information $\hat{C}_i$ of the first agent based on the neighborhood cognition information $\hat{C}_j$ of the second agent, so that $\hat{C}_j$ is consistent with $\hat{C}_i$.

15. The apparatus according to claim 14, wherein the processing circuit is configured to:

train the neural network generating $\hat{C}_i$ based on a loss function comprising $\hat{C}_j$ and $\hat{C}_i$.

16. The apparatus according to claim 11, wherein the processing circuit is configured to:

determine the neighborhood cognition information $\hat{C}_i$ of the first agent based on the first information and a variational autoencoder.

17. The apparatus according to claim 11, wherein:

the communication circuit is further configured to determine an estimate $\hat{o}_i$ of the environment information of the first agent based on the neighborhood cognition information $\hat{C}_i$ of the first agent; and the processing circuit is further configured to train the neural network generating C; based on a loss function comprising $\hat{o}_i$.

18. The apparatus according to claim 11, wherein the processing circuit is further configured to:

determine a Q value of the first agent based on the individual cognition information and the neighborhood cognition information of the first agent; and train the first agent based on the Q value of the first agent.

19. The apparatus according to claim 18, wherein the processing circuit is configured to:

determine Q values $Q_{total}$ of a plurality of agents based on the Q value of the first agent and a Q value of the second agent; and train the first agent based on $Q_{total}$.

20. A non-transitory computer-readable storage medium, wherein the computer-readable storage medium stores a computer program; and when the computer program is executed by a processor, the processor is enabled to perform:

obtaining environment information of a first agent and environment information of a second agent;

generating first information based on the environment information of the first agent and the environment information of the second agent; and training the first agent by using the first information, so that the first agent outputs individual cognition information and neighborhood cognition information, wherein the neighborhood cognition information of the first agent is consistent with neighborhood cognition information of the second agent.

\* \* \* \* \*